(12) United States Patent
Thomas et al.

(10) Patent No.: US 9,846,038 B2
(45) Date of Patent: Dec. 19, 2017

(54) EXPORT USER DATA FROM DEFINED REGION

(71) Applicant: Navico Holding AS, Egersund (NO)

(72) Inventors: Stephen Thomas, Tulsa, OK (US); Tracy Brown, Jr., Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 594 days.

(21) Appl. No.: 13/791,805

(22) Filed: Mar. 8, 2013

(65) Prior Publication Data

US 2014/0013260 A1    Jan. 9, 2014

Related U.S. Application Data

(60) Provisional application No. 61/708,591, filed on Oct. 1, 2012, provisional application No. 61/668,970, filed on Jul. 6, 2012.

(51) Int. Cl.
| | |
|---|---|
| *G06F 3/048* | (2013.01) |
| *G01C 21/00* | (2006.01) |
| *G06F 3/0484* | (2013.01) |
| *G01C 21/20* | (2006.01) |
| *G01S 15/89* | (2006.01) |
| *G01S 7/62* | (2006.01) |

(52) U.S. Cl.
CPC ............. *G01C 21/00* (2013.01); *G01C 21/20* (2013.01); *G06F 3/0484* (2013.01); *G01S 7/6272* (2013.01); *G01S 15/89* (2013.01)

(58) Field of Classification Search
None
See application file for complete search history.

(56) References Cited

U.S. PATENT DOCUMENTS

| | | | |
|---|---|---|---|
| 4,829,493 | A | 5/1989 | Bailey |
| 4,879,697 | A | 11/1989 | Lowrance et al. |
| 5,025,423 | A | 6/1991 | Earp |
| 5,191,341 | A | 3/1993 | Gouard et al. |
| 5,537,380 | A | 7/1996 | Sprankle et al. |
| 6,225,984 | B1 | 5/2001 | Crawford |
| 6,321,158 | B1 | 11/2001 | DeLorme et al. |
| 6,411,283 | B1 | 6/2002 | Murphy |
| 6,418,080 | B2 | 7/2002 | Inouchi |

(Continued)

OTHER PUBLICATIONS

PCT International Search Report and Written Opinion; PCT/IB2013/060285; dated Feb. 18, 2014.

(Continued)

*Primary Examiner* — William Trapanese
(74) *Attorney, Agent, or Firm* — Nelson Mullins Riley & Scarborough LLP

(57) ABSTRACT

Described herein are implementations of various technologies for an apparatus and method for providing navigation data. In one implementation, a non-transitory computer-readable medium having stored thereon a plurality of computer-executable instructions. When the plurality of computer-executable instructions are executed by a computer, the plurality of executable instructions causes the computer to receive a user selection of a plurality of points of navigation data and receive a user selection of a geographical region. The computer can select at least a portion of the plurality of the points of the navigation data that are in the geographical region.

16 Claims, 11 Drawing Sheets

(56) References Cited

U.S. PATENT DOCUMENTS

| | | | |
|---|---|---|---|
| 6,421,299 B1 | 7/2002 | Betts et al. | |
| 6,761,692 B2 | 7/2004 | Angelsen et al. | |
| 6,816,782 B1 | 11/2004 | Walters et al. | |
| 7,002,579 B2 | 2/2006 | Olson | |
| 7,236,426 B2 | 6/2007 | Turner et al. | |
| 7,415,336 B1 * | 8/2008 | Burch | G01C 23/00 340/994 |
| 7,430,461 B1 | 9/2008 | Michaels | |
| 7,475,057 B1 * | 1/2009 | Obradovich | 701/532 |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2008/0126935 A1 | 5/2008 | Blomgren | |
| 2008/0204424 A1 | 8/2008 | Jin et al. | |
| 2008/0307512 A1 * | 12/2008 | Tandon | G06Q 30/06 726/4 |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0192703 A1 * | 7/2009 | Hess | G01C 21/3461 701/532 |
| 2009/0197617 A1 * | 8/2009 | Jayanthi | G01C 21/3438 455/456.2 |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0153186 A1 * | 6/2011 | Jakobson | G01C 21/20 701/532 |
| 2011/0154183 A1 | 6/2011 | Burns et al. | |
| 2011/0213515 A1 * | 9/2011 | Haymart | G01C 21/00 701/21 |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2013/0007665 A1 | 1/2013 | Chaudhri et al. | |
| 2013/0169673 A1 * | 7/2013 | Garrett | G06F 17/30241 345/629 |

OTHER PUBLICATIONS

PCT International Search Report and Written Opinion; PCT/US2013/047869; dated Oct. 21, 2013.
PCT International Search Report and Written Opinion; PCT/US2013/048177; dated Oct. 21, 2013.
PCT International Search Report and Written Opinion; PCT/US2013/048129; dated Oct. 17, 2013.
PCT International Search Report and Written Opinion; PCT/US2013/047926; dated Oct. 11, 2013.
PCT International Search Report and Written Opinion; PCT/US2013/047645; dated Sep. 27, 2013.

* cited by examiner

EXPORT USER DATA FROM DEFINED REGION

CROSS-REFERENCE TO RELATED APPLICATIONS

This application claims the benefit of U.S. Provisional Patent Application Ser. No. 61/668,970, filed Jul. 6, 2012, titled EXPORT USER DATA FROM DEFINED REGION, and the disclosure of which is incorporated herein by reference.

This application claims the benefit of U.S. Provisional Patent Application Ser. No. 61/708,591, filed Oct. 1, 2012, titled EXPORT USER DATA FROM DEFINED REGION, and the disclosure of which is incorporated herein by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A memory of past points can be very useful for marine activities. However, past points that are outside the locale of the user may not be very relevant to the user. Moreover, if the locale of the user is small, the user may have to filter a large number of past points to reach the points that are relevant.

SUMMARY

Described herein are implementations of various technologies for an apparatus and method for providing navigation data. In one implementation, a non-transitory computer-readable medium having stored thereon a plurality of computer-executable instructions. When the plurality of computer-executable instructions are executed by a computer, the plurality of executable instructions causes the computer to receive a user selection of a plurality of points of navigation data and receive a user selection of a geographical region. The computer can select at least a portion of the plurality of the points of the navigation data that are in the geographical region.

In one implementation, an apparatus can include one or more processors, a screen, and a memory. The memory can store a plurality of executable instructions. When the plurality of executable instructions are executed by the one or more processors, the plurality of executable instructions causes the one or more processors to receive a user selection of a plurality of points of navigation data and receive a user selection of a geographical region. The one or more processors can select at least a portion of the plurality of the points of the navigation data that are in the geographical region.

In one implementation, a method can provide navigation data by receiving a user selection of a plurality of points of navigation data and receiving a user selection of a geographical region. A processor can then select at least a portion of points of navigation data that are in the geographical region.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
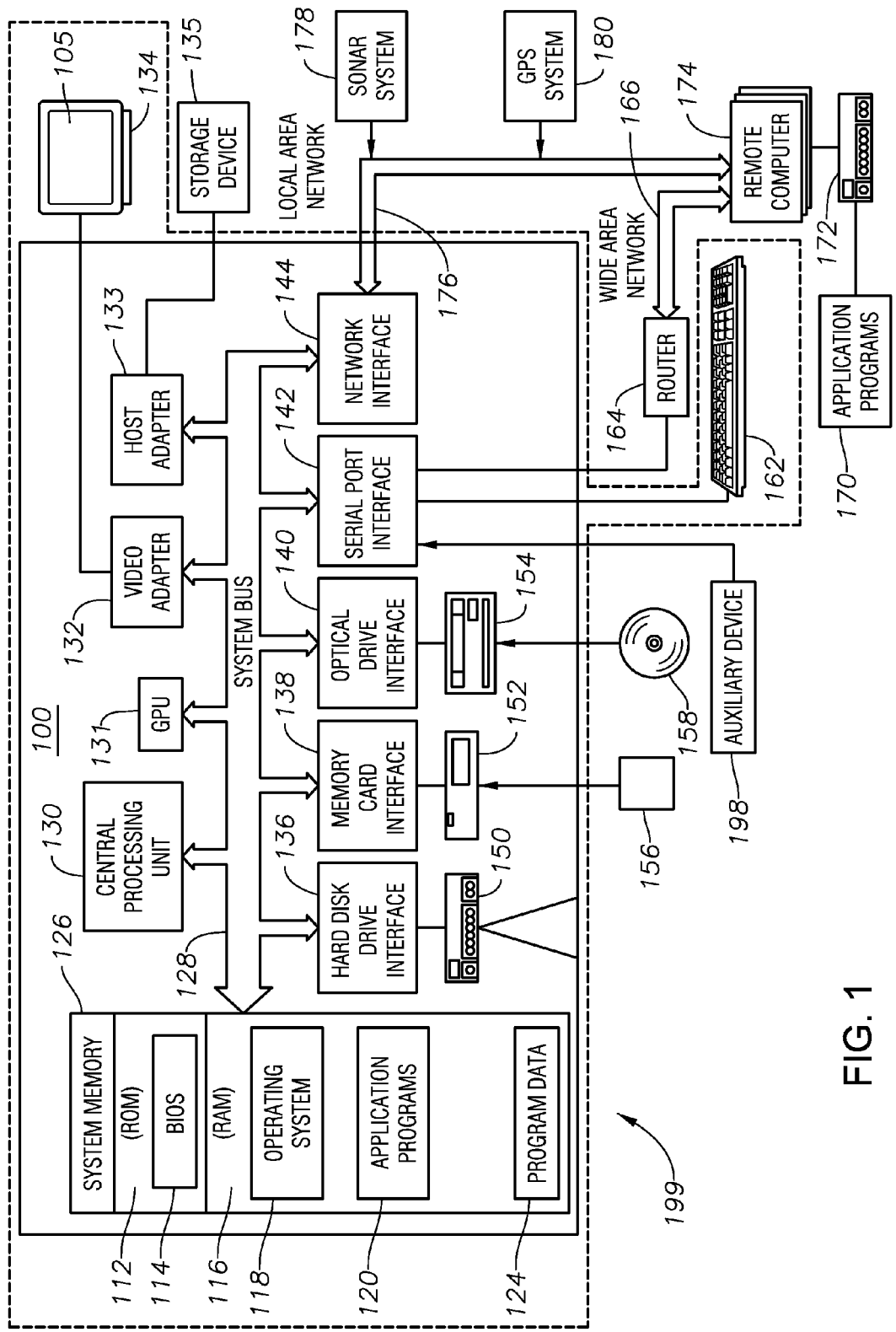
FIG. 1 is a schematic diagram of a multi-function display in accordance with various techniques described therein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that "user request" or "user can request" shall also include, but are not limited to, touching the screen, double tapping the screen (tapping the screen twice in rapid succession), pressing a particular physical or virtual button, making a selection from a menu, placement of a cursor at a particular location, stylus pointing, mouse selection, an audible command, as well as the explicit description of the "user request" for the particular operation or how the "user can request", explicitly, the particular operations.

In certain implementations, a multi-function display is provided. The multi-function display can include a variety of components commonly found in computing system, including memory, processors, and peripherals, such as a keyboard and an output screen. Additionally, the multi-function display may be connected to, or otherwise, have access to a sonar system and a GPS system.

The multi-function display may allow the user to select various points, routes, and trails for storage in a memory device. In certain implementations, the multi-function display may also allow the user to associate certain information with the points. At a later point in time, the user may select a locale or region of interest, and recall all of the recorded points, along with the information associated with the points in the locale or region of interest.

Additionally, the user may attach an auxiliary device to the multi-function display and download the points and information associated with the points in the locale or region of interest. Additionally, the multi-function display may determine the data format used by the auxiliary device and convert data to the format of the auxiliary device. The multi-function display may then transmit the data to the auxiliary device.

This document will first describe the computing system within the multi-function display, then the operation of the multi-function display, followed by demonstrations of user selections of points, followed by user selections of locales or regions of interest, and then followed by a demonstration of downloading data to an auxiliary device.

Multi-Function Display

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 1 illustrates a schematic diagram of a multi-function display 199 comprising a computing system 100 in which the various technologies described herein may be incorporated and practiced. The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 can include a microprocessor, a microcontroller, a processor, a programmable integrated circuit, or a combination thereof. The CPU 130 can comprise an off-the-shelf processor such as a Reduced Instruction Set Computer (RISC™), or a Microprocessor without Interlocked Pipeline Stages (MIPS™) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a screen 105. The screen 105 can be sensitive to heat or touching (now collectively referred to as a "touch screen").

The system bus 128 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide nonvolatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The remote computers 174 can also include hard disks 172 that store application programs 170.

A number of program modules may be stored on the hard disk 150, memory card 156, optical disk 158, ROM 112 or RAM 116, including an operating system 118, one or more application programs 120, and program data 124. In certain implementations, the hard disk 150 may store a database system. The database system could include, for example, recorded points. The application programs 120 may include various mobile applications ("apps") and other applications configured to perform various methods and techniques described herein. The operating system 118 may be any suitable operating system that may control the operation of a networked personal or server computer.

A user may enter commands and information into the computing system 100 through input devices such as buttons 162. Other input devices may include a microphone (not shown). These and other input devices may be connected to the CPU 130 through a serial port interface 142 coupled to system bus 128, but may be connected by other interfaces, such as a parallel port, game port or a universal serial bus (USB).

Certain implementations may be configured to be connected to a GPS system 180, and/or a sonar system 178. The GPS system 180, and/or sonar system 178 may be connected via the network interface 144. The computing system 100, the monitor 134, the screen 105, and the buttons 162 may be integrated into a console, now referred to as a multifunction display (MFD) 199.

In certain implementations, the MFD 199 may be configured to be connected to an auxiliary device 198. The auxiliary device 198 can be a smaller handheld device that a user can use while in a localized region. The MFD 199 can be taken to store data and information from points in a world-wide domain over a long period of time, while the auxiliary device 198 may be more suited for temporary usage of data, such as when the user is in a particular locale. The auxiliary device 198 might not be equipped or particularly suited for storage of large amounts of data. Accordingly, the MFD 199 may be configured to provide the auxiliary device 198 with waypoints, trails, and routes that are from a user selected region in the data format used by the auxiliary device 198. The auxiliary device 198 can be connected to the MFD 199 via the serial port interface 142 (shown), network interface 144 (not shown), the LAN, or WAN 166.

Operation

Figure 2:
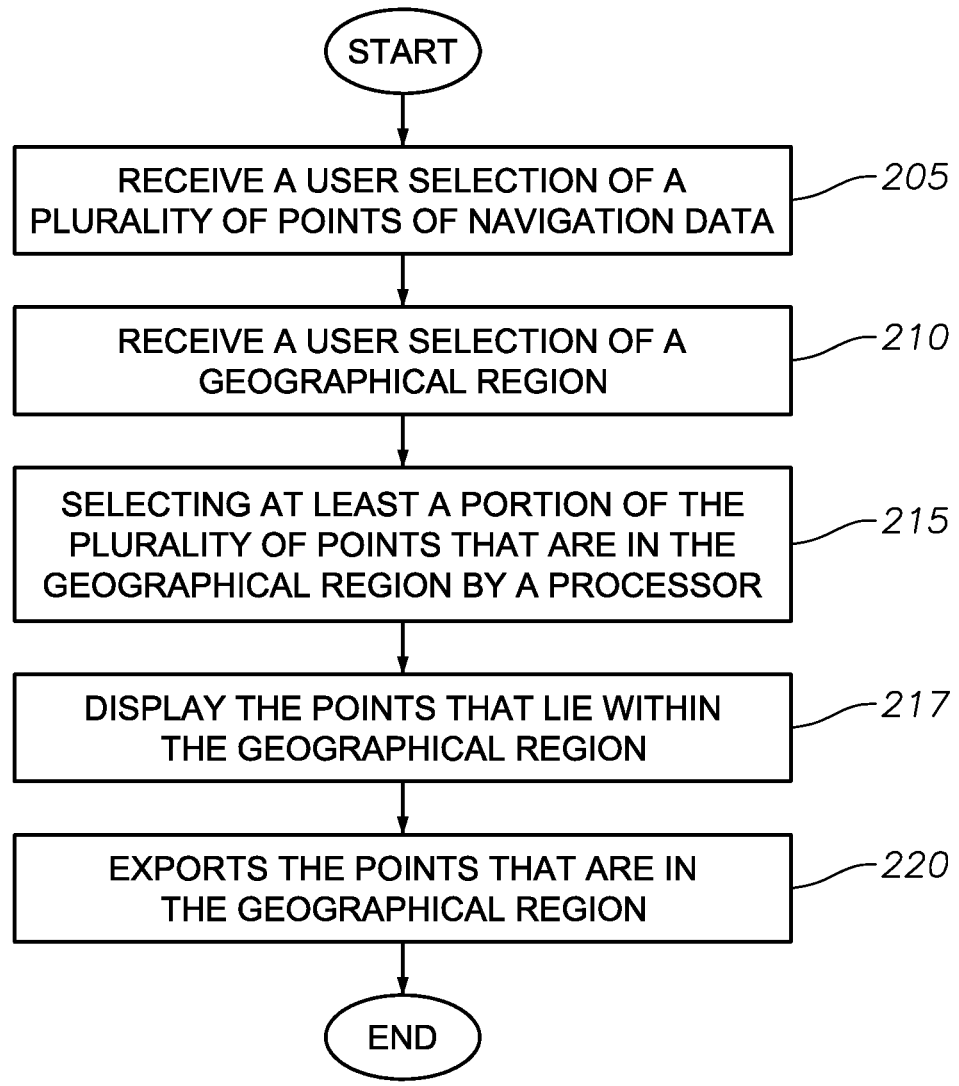
FIG. 2 is a flow diagram for providing navigation data in accordance with various techniques described therein.

FIG. 2 illustrates a flow diagram for providing navigation data in accordance with various implementations described herein. At block 205, the MFD 199 receives a user selection of a plurality of points of navigation data. The plurality of points may include waypoints, trails, and routes, or a combination thereof. In certain implementations, the MFD 199 may receive metadata and icons associated with the points.

Waypoints may be defined as user selected points. The information for each point may include a variety of information, such as latitude, and longitude, as well as user-taken notes. The user-taken notes may also be referred to as metadata. In certain implementations, the user-taken notes may be associated with icons.

Routes are used to chart a course to get from a place of origination to a destination, and include points that are the endpoints of different legs of the charted course. For example, if a user uses a navigation system, the navigation system may build a route for the user to follow to get to their destination. In certain implementations, the user may build a navigation route by selecting the endpoints of each leg of the charted course.

Trails are a path of points that a vessel or vehicle carrying the MFD 199 travels. The points of the trail can be automatically received from the GPS system 180.

Waypoints, points from routes, points from trails, or other types of points, and data associated therewith may also be referred to herein as "points".

In certain implementations, the waypoints, metadata, icons, routes, and trails may be stored in a database. The database may be part of the hard disk drive 150.

The user may select the points by use of an input device such as some of the plurality of buttons 162, interaction with a touch sensitive screen 105, or interaction with objects in a graphical user interface displayed on the screen 105. The user may interact with the objects in the graphical user interface, by, for example, using a mouse or some of the plurality of buttons 162. In some implementations, the user may select the points using a stylus.

At block 210, the MFD 199 receives a user selection of a geographical region. The MFD 199 may receive the user selection of the geographical region in a variety of different ways. In one implementation, the user may hand trace a closed region on a touch screen 105. In another implementation, the user may provide the latitudes and longitudes of points that define the closed region. For example, the user may provide the latitudes and longitudes by pressing one or more of the plurality of buttons 162, by touching the points on a touch screen, or by selecting the points with a stylus. The user can also select a geographical area that is within a particular radius of a location.

In certain implementations, the user can select a predefined geographical region, such as a political region (such as a city, county, state/province, or country), geographical regions with a common reference (such as the metropolitan area of a city, or a continent), and geographical features (such as mountain ranges, near rivers, or bodies of water).

At block 215, the CPU 130 in the MFD 199 selects the points received during block 205 that lie within the geographical region. At block 217, the MFD 199 displays the points that lie within the geographical region. At block 220, the MFD 199 exports the points. The MFD 199 may export the points to an auxiliary device 198 connected to the MFD 199 via an interface, such as a serial port interface or network interface, or a combination thereof.

In certain implementations, the MFD 199 may select the points and place the points in a file. For example, a user can select a file management option. After selecting the file management option, the user can select a database management option. The user can then request that the MFD 199 export the points in the geographical region to a destination file. The user can then give a name for the destination file. The file name can be descriptive of, for example, the geographical area. The destination file can be transmitted to an auxiliary device 198.

It shall be understood that exporting the points is one manner of transmitting the points. The hard disk drive 150 may store the points (waypoints, trails, routes, metadata, and icons) in a particular format. In certain implementations, the MFD 199 may determine the type of auxiliary device and/or data format used by the auxiliary device 198, and reformat the points within the geographical region to the data format used by the auxiliary device 198.

In certain implementations, the central processing unit 130 can compare the position calculated by the GPS System 180 with the user selection of the geographical region. The central processing unit 130 can cause the MFD 199 to initiate an alert or alarm when the GPS System 130 detects the MFD 199 to be within a predetermined distance from the user selection of a geographical region received during block 210.

Figure 3:
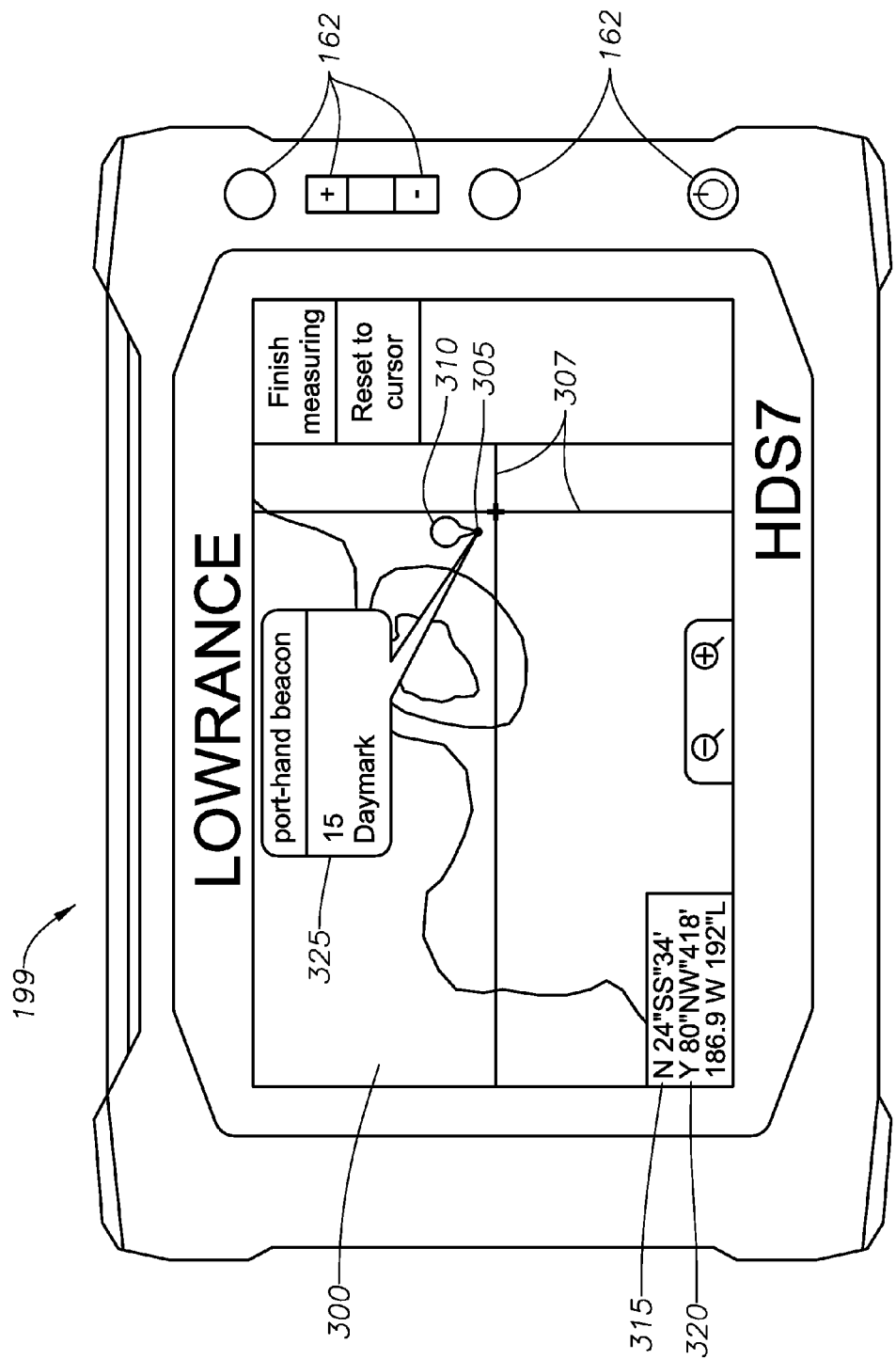
FIG. 3 is a schematic of a chart diagram with waypoints in accordance with various techniques described therein.

FIG. 3 is a schematic of a chart diagram 300 with waypoints in accordance with various techniques described therein. The chart diagram 300 is a localized map of the location surrounding the MFD 199 and appears on the screen 105. By default, the center of the chart diagram 300 can indicate the current location of the MFD 199. The GPS system 180 can determine the location of the MFD 199. A suitably equipped GPS system 180 can also cause the MFD 199 to display a map of the local region surrounding the location of the MFD 199.

A waypoint 305 may be a point of interest that may be selected by a user. The user can select the waypoint 305 in a variety of manners. For example, the user may select the waypoint 305 by using a cross-hair cursor 307 and making a selection from a menu or pressing one of the plurality of buttons 162. Alternatively, if the screen 105 is a touch screen, the user can touch the waypoint 305.

In certain implementations, the MFD 199 can record the latitude 315 and longitude 320 coordinates upon selection of the waypoint 305. In addition, the user can add notes 325 that are associated with the waypoint 305. The notes 325 may also be stored with the waypoint 305. An icon 310 may also be associated with the waypoint 305. As will be shown later with reference to FIG. 7, the MFD 199 may provide a menu of different icons 310 indicating various information.

Figure 4:
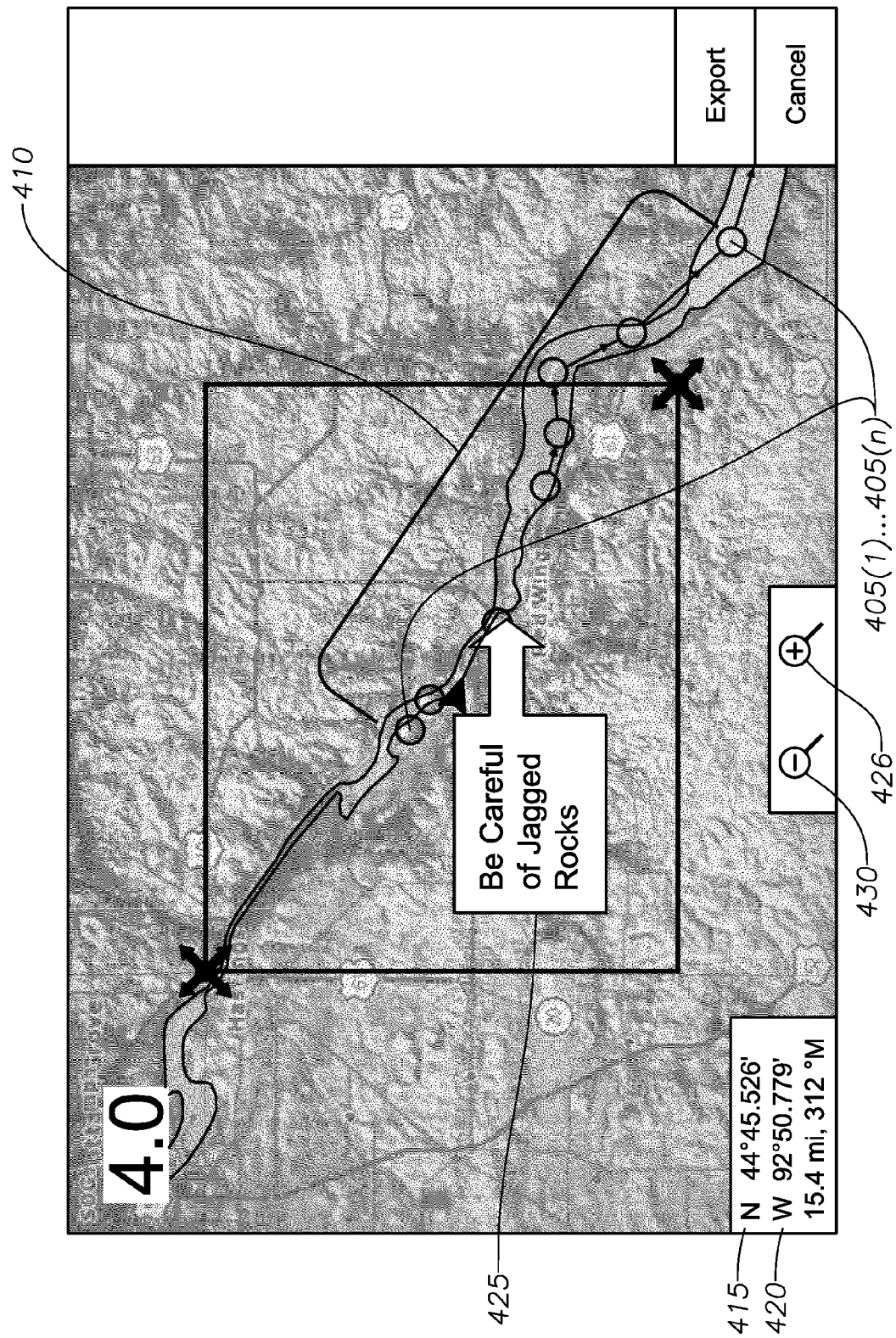
FIG. 4 is a schematic of a chart diagram with route data in accordance with various techniques described herein.

In one implementation, the user can build a route by selecting various waypoints. The selected points may be connected together to form a route. FIG. 4 is a schematic of a chart diagram with waypoints 405(1) . . . 405(n) forming a route 410 in accordance with various techniques described herein. The route 410 includes a point of origination 405(1) and a point of destination 405(n). The user may also use zooming 426, 430 on the chart diagram to view a larger or finer region when forming the route 410.

A user can select waypoints 405 forming the route 410 in a similar manner as selecting waypoints 305. That is, after the waypoints 405(1) . . . 405(n) are selected, the route 410 may be formed by a user request, such as a selection from a menu. In certain implementations, where the waypoints 405(1) . . . 405(n) are in close proximity to each other, the MFD 199 may automatically connect the waypoints 405(1) . . . 405(n) to form a route 410.

The latitude 415 and longitude 420 coordinates for each of the waypoints 405(1) . . . 405(n) forming the route 410 may be recorded upon selection of each waypoint 405(1) . . . 405(n). The user can also add notes 410 that are associated with at least some if not all of the waypoints 405. The notes 425 may also be stored with the waypoints 405. As in the case with waypoints 305, the user can associate an icon (not shown) with at least some if not all of the waypoints 405 forming the trail 410.

Each of the waypoints 405(1) . . . 405(n) that form the route 410 built by the user can be stored, along with the longitude 415 and latitude 420 associated with each point, as well as any notes 425 and icons that are associated with the respective waypoints 405(1) . . . 405(n). Additionally, the route 410 may be stored as a specific data structure.

Figure 5:
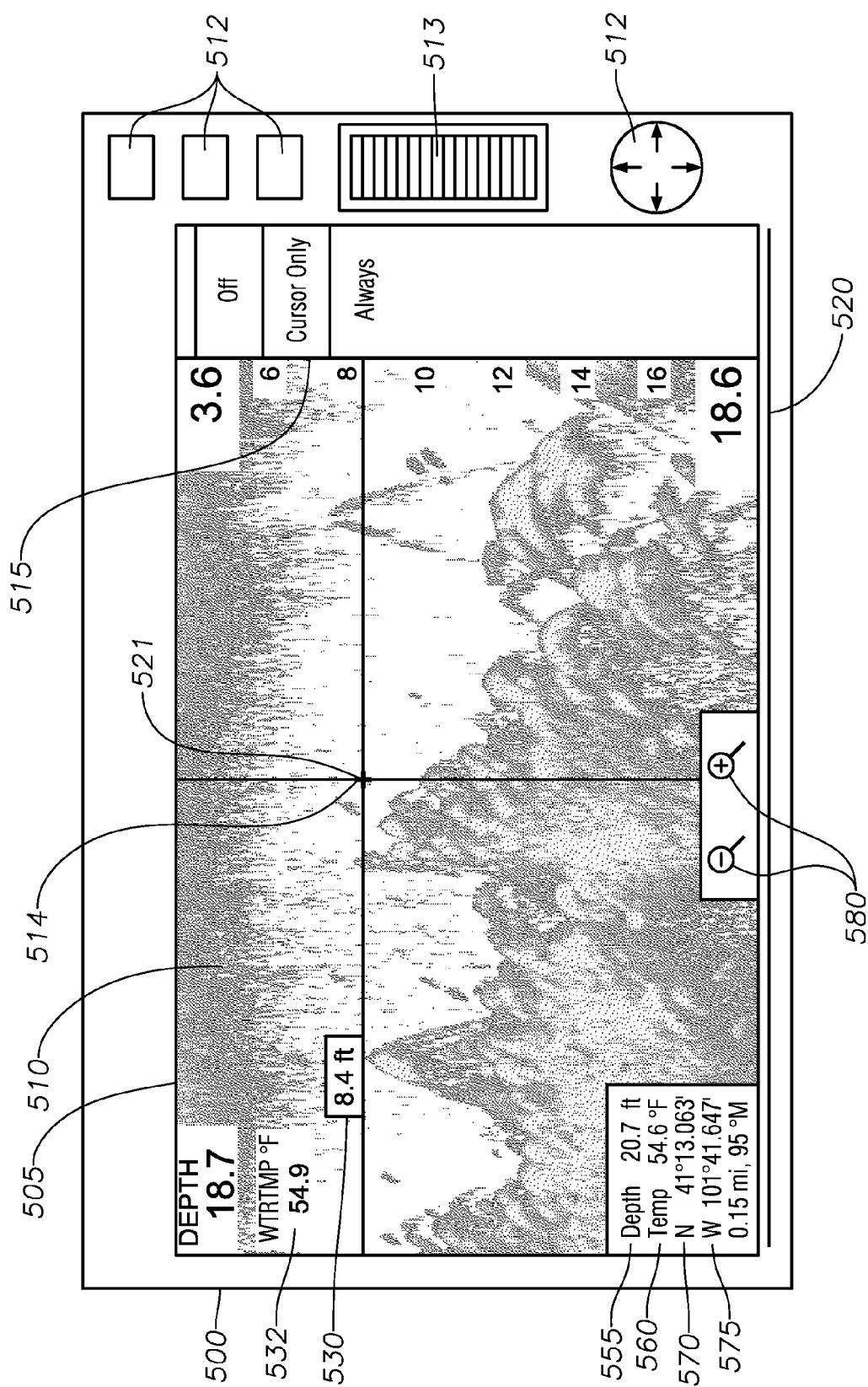
FIG. 5 is a schematic of sonar images with waypoints in accordance with various techniques describe herein.

Waypoints are not limited to chart diagrams. For example, in certain implementations, the MFD 199 can also provide sonar images. FIG. 5 is a schematic diagram of sonar images and a waypoint. As noted above, the MFD 199 may include a screen 105 that provides a graphical user interface for displaying sonar images 510. Sonar images 510 may provide a map of the underlying body of water in the vicinity of a sonar device, e.g., a vessel carrying the MFD 199.

In some implementations, the display device 100 may provide a cursor 514. The cursor 514 may be movable by placement of the finger over the cursor 514 and dragging the finger to a desired location. The MFD 199 may cause the cursor 514 to follow the finger.

The sonar images 510 may be presented as two-dimensional graphics, where the vertical axis 515 represents depth and the horizontal axis 520 represents time. The user can use the cursor 514 for pointing to a particular location in the graphical user interface and selecting a waypoint 521. In certain implementations, the MFD 199 presents the cursor 514 in response to receiving a user request for the cursor 514.

The graphical user interface can provide specific information about the particular location, such as depth 530 of the waypoint 521 and estimated water temperature 532 at the waypoint 521. The graphical user interface can also provide ocean depth 555, estimated water temperature 560, latitude 570 and longitude 575 at the floor of the body of water at a current location of the vessel carrying the MFD 199. The graphical user interface can also provide zooming 580 for more detail or more range.

The user may select a waypoint 521 for recording. The waypoint 521 can be stored, along with information such as depth 530 of the waypoint 521, estimated water temperature 532, ocean depth 555 at the waypoint, estimated water temperature at the floor of the body of water 560, latitude 570 and longitude 575 of the waypoint 521. Additionally, the user can select a particular icon (not shown). The icon can be selected from a menu of icons as will be later described with reference to FIG. 7.

Figure 6:
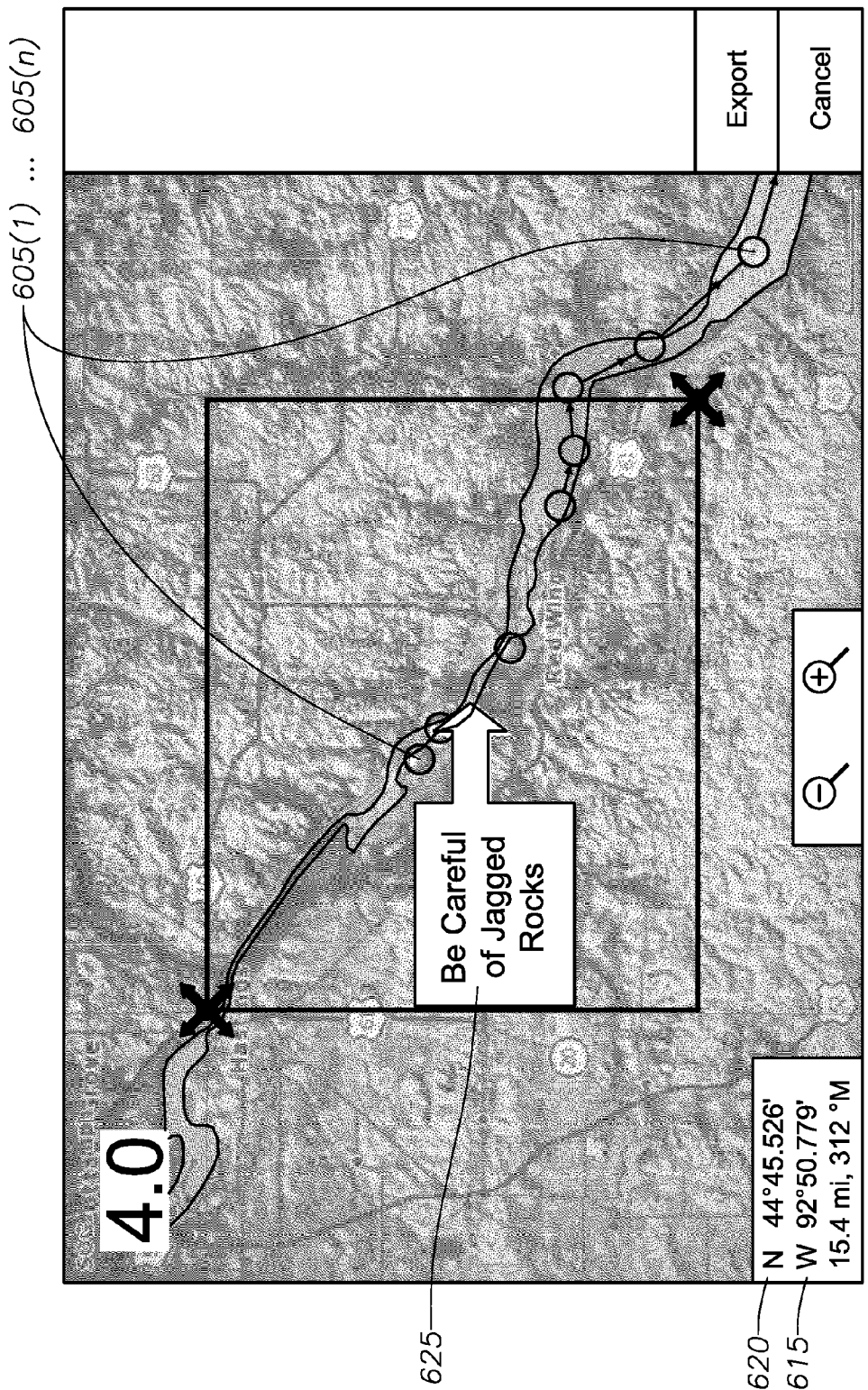
FIG. 6 is a schematic of a chart diagram with trail data in accordance with various techniques described therein.

FIG. 6 is a schematic of chart diagram trail data in accordance with various implementations described herein. The trail data includes a sequence of waypoints 605(1) . . . 605(n). The waypoints 605 represent the locations that the MFD 199, or a vessel carrying the MFD 199, traverse. The waypoints 605 can be automatically recorded by the MFD 199 as the MFD 199 traverses the path.

Similar to cases involving waypoints, the user can request entry of notes as well as association of icons with waypoints. Additionally, the notes 625, longitude 615, and latitude 620 are stored with each of the waypoints forming the trail.

Figure 7:
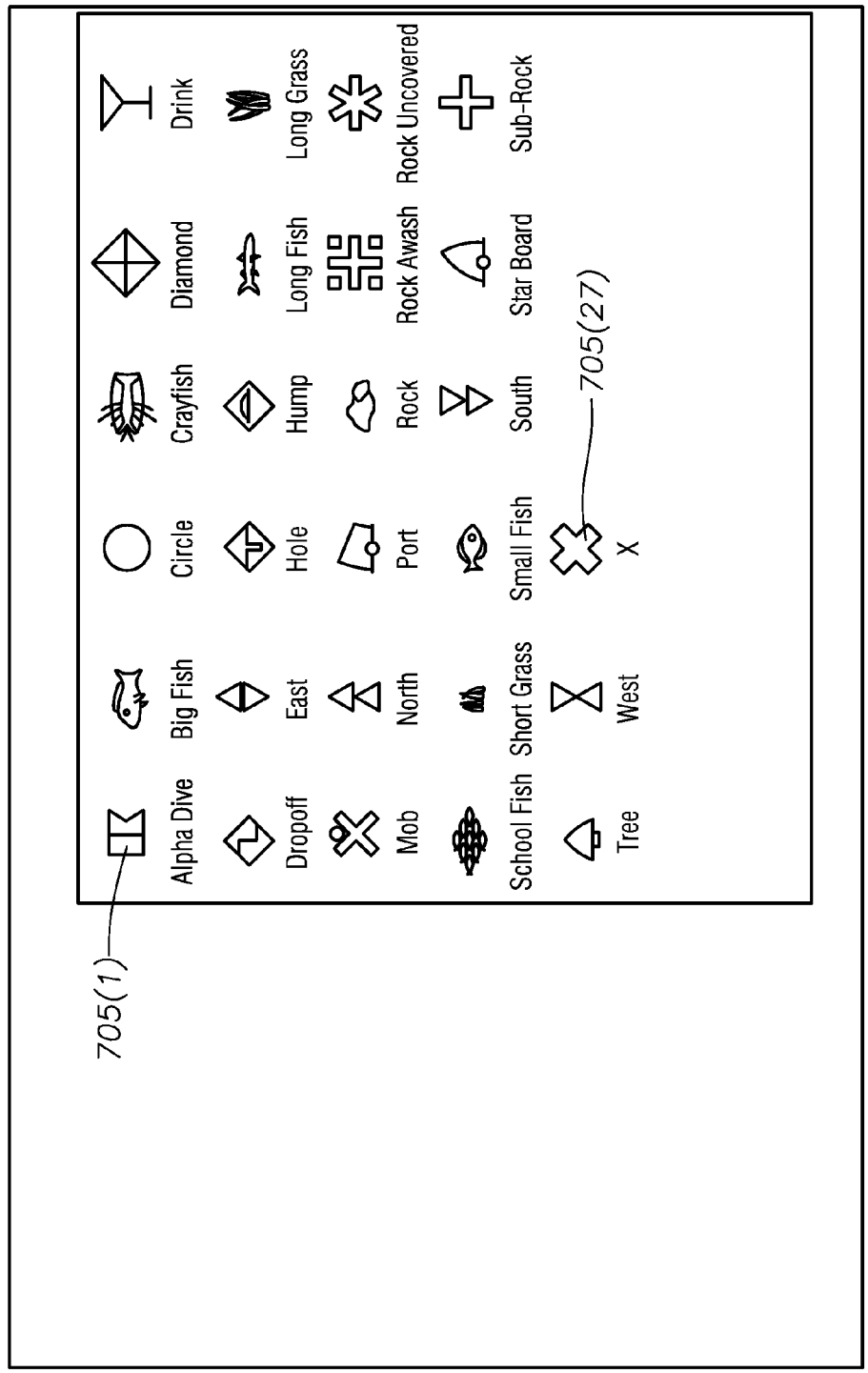
FIG. 7 is a schematic of an icon graphical user interface in accordance with various techniques describe herein.

FIG. 7 is a schematic of a menu 700 of icon 705(1) . . . 705(27) selections in accordance with various techniques described therein. The following is an exemplary list of items that the icons can represent:

705(1)—Alpha Dive
705(2)—Big Fish
705(3)—Circle
705(4)—Crayfish
705(5)—Diamond
705(6)—Drink
705(7)—Dropoff
705(8)—East
705(9)—Hole
705(10)—Hump
705(11)—Long Fish
705(12)—Long Grass
705(13)—Mob
705(14)—North
705(15)—Port
705(16)—Rock
705(17)—Rock Awash
705(18)—Rock Uncovers
705(19)—School Fish
705(20)—Short Grass
705(21)—Small Fish
705(22)—South
705(23)—Star Board
705(24)—Sub-Rock
705(25)—Tree
705(26)—West
705(27)—X (Marks the Spot)

User Selection of the Geographic Region

Figure 8:
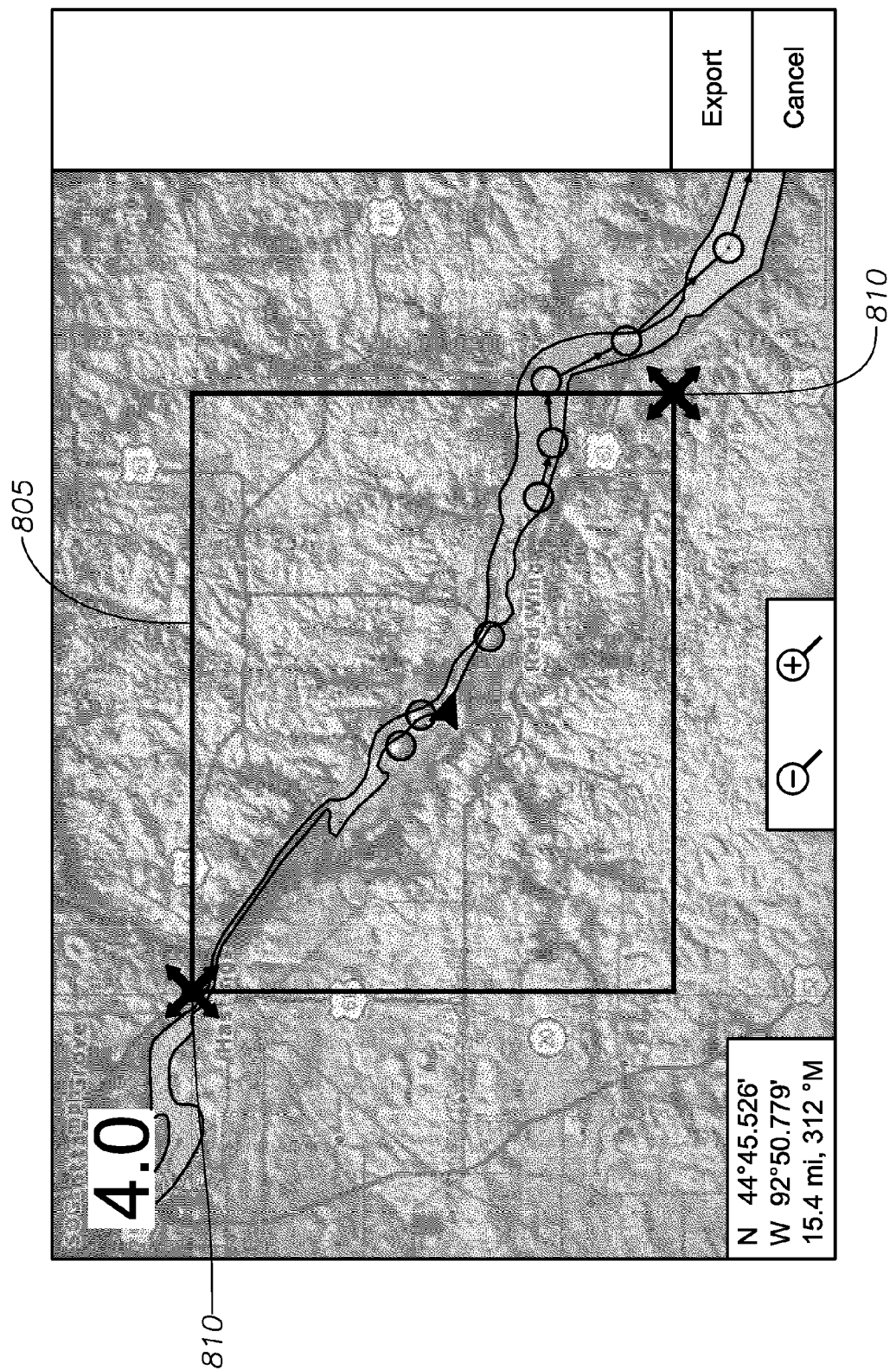
FIG. 8 is a schematic diagram for entering a user-defined region in accordance with various techniques described therein.
Figure 9:
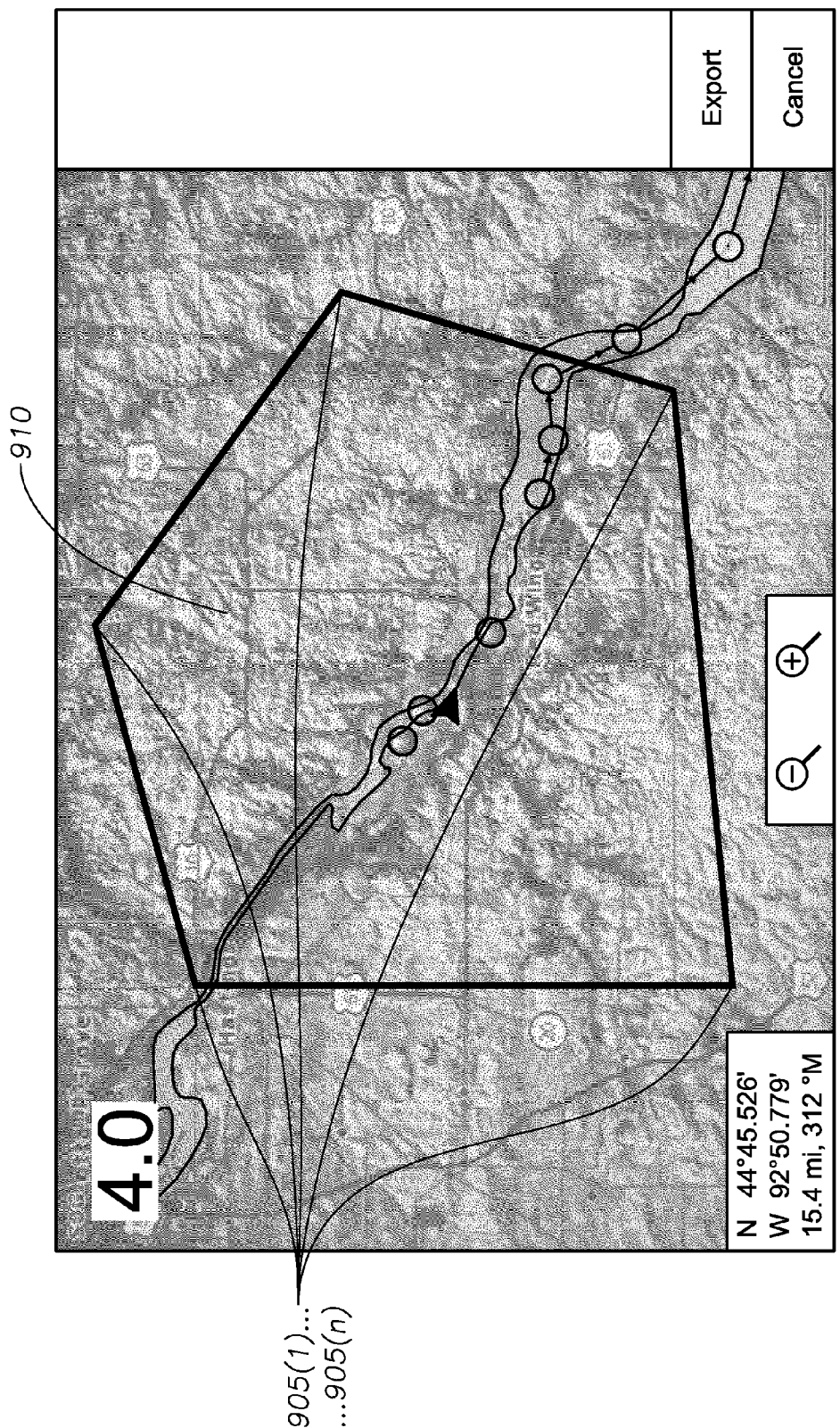
FIG. 9 is a schematic diagram for touch-pointing a user-defined region in accordance with various techniques described therein.
Figure 10:
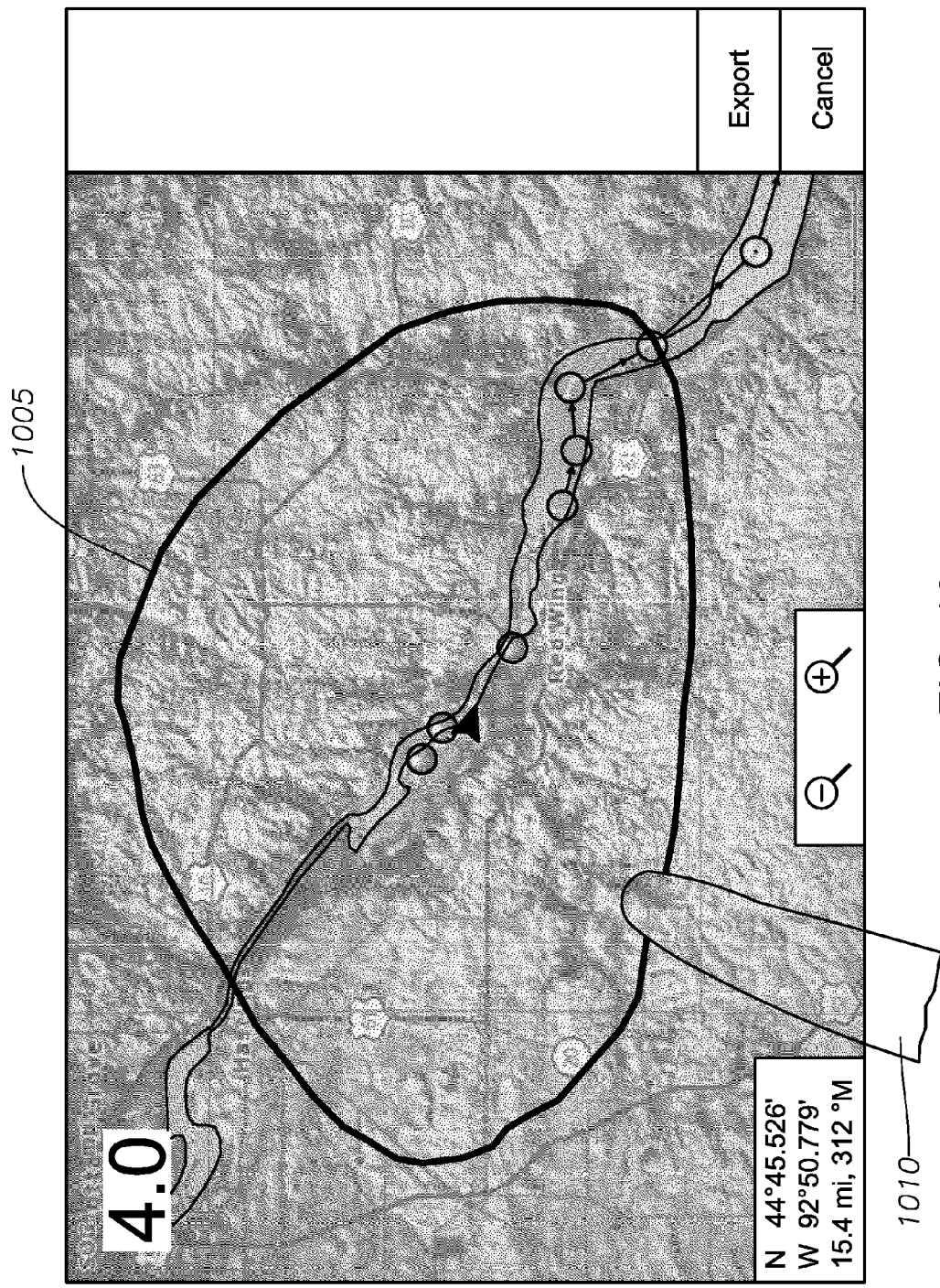
FIG. 10 is a schematic diagram for finger tracing a user-defined region in accordance with various techniques described therein.

As mentioned above with reference to block 210 in FIG. 2, the MFD 199 may receive a user selection of a geographical region. FIGS. 8-10 describe how a user can select a geographical region in accordance with various techniques described therein. FIG. 8 describes selection of the geographical region by selecting latitude and longitude coordinates using, for example, physical or virtual buttons. FIG. 9 describes selection of the closed geographical region by touching, or selecting points with virtual or physical buttons. FIG. 10 describes defining a geographical region by finger tracing the region.

FIG. 8 is a schematic diagram for entering a user-defined region in accordance with various techniques described therein. The user can select the latitude and longitude coordinates of a region. The latitude and longitude coordinates can be selected by pressing some of the plurality of buttons 162. In certain implementations, the user can make a selection from a menu to bring up a virtual keyboard, wherein the user can enter the coordinates. Entry of a range of latitude coordinates and longitude coordinates may result in a rectangular box 805, wherein the corners 810 are identified. In certain implementations, the user can touch corners of a contemplated rectangular box representing the locale or area of interest.

FIG. 9 is a schematic diagram for touch-pointing a user-defined region in accordance with various techniques described herein. The user can request selection of points 905(1) . . . 905(n) that defines a closed region 910. The user can select the points 905 by touching the points on the screen, entry of latitude/longitude coordinates on a virtual keyboard, or a variety of other means.

FIG. 10 is a schematic diagram for finger tracing a user-defined region in accordance with various techniques described therein. In certain implementations, where the screen 105 is a touch-screen, user can request a region 1005 by tracing it with their finger 1010.

Exporting the Points

Figure 11:
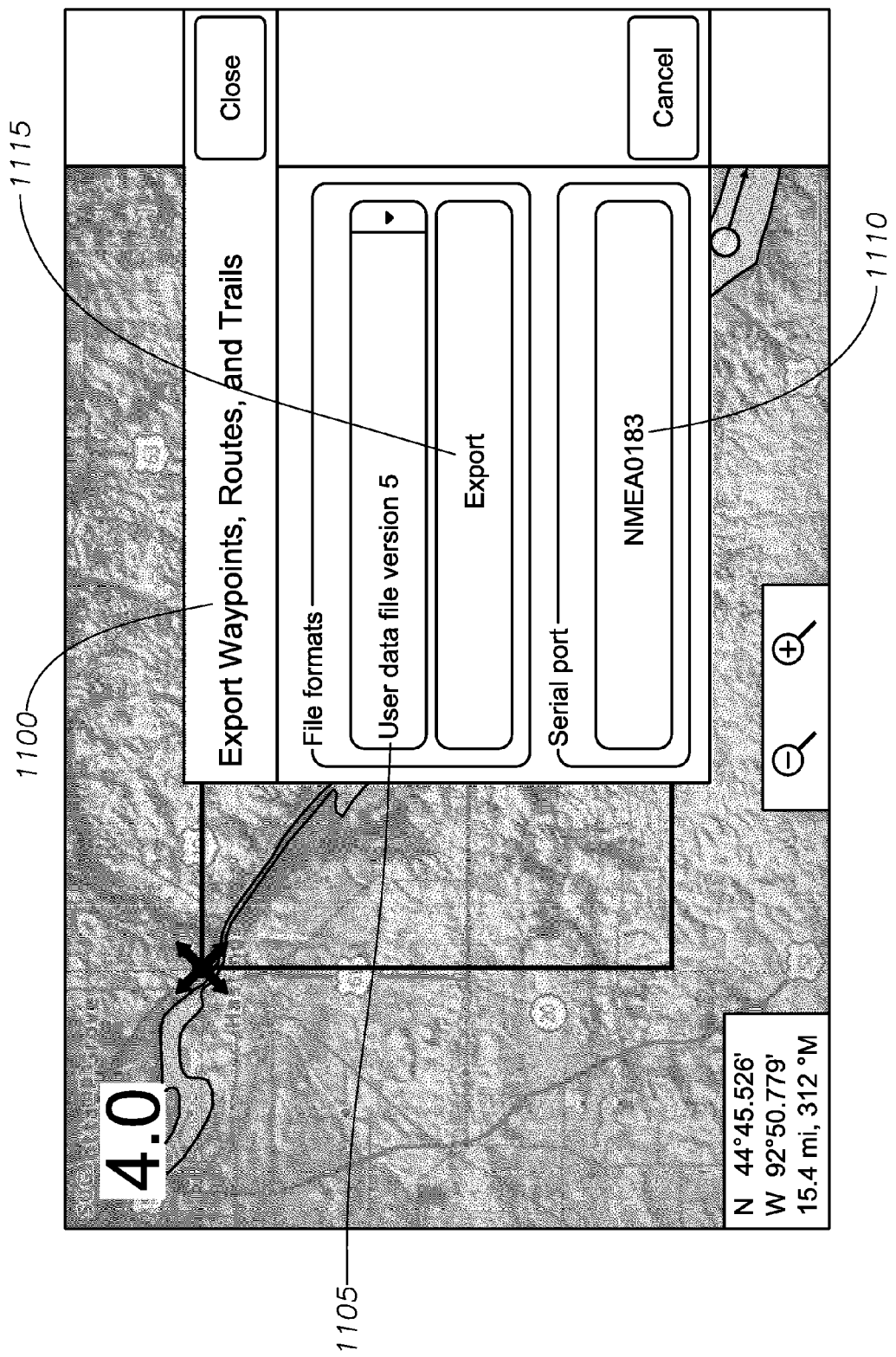
FIG. 11 is a schematic diagram of a graphical user interface for exporting navigation data in accordance with various techniques described therein.

As mentioned above with reference to block 220 in FIG. 2, the MFD 199 may export the points to the auxiliary device 198. FIG. 11 is schematic diagram of a graphical user interface for exporting waypoints, trails, and routes in accordance with implementations described herein. Upon receipt of waypoints, trails, and routes, receipt of a user-defined region, and a request for exporting waypoints, trails, and routes, in the user-defined region, the MFD 199 determines the waypoints that are in the region. In the case of trails and routes, the MFD 199 may determine the portions of the trails and routes that are in the user-defined region, and export only the portions of the trails and routes that are in the user-defined region as trail and route data structures. In some implementations, the MFD 199 might only export the waypoints making up the trails and routes that are in the user-defined region and export the waypoints.

The graphical user interface can include a user prompt 1100 for exporting the waypoints, trails, and routes to the auxiliary device 198. In certain implementations, the MFD 199 automatically determines the format of the auxiliary device, displays it by default 1105, and automatically identifies 1110 the type of auxiliary device 198 that is connected to the serial port, e.g., NMEA0183. In other implementations, the user can select the format 1105. Upon selection of the export button 1115, the MFD 199 exports the waypoints, routes, trails, icons, and notes to the auxiliary device 198.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:

generate, at a marine electronic device on a watercraft and based on user input directed to the marine electronic device, a point of interest, wherein the point of interest comprises at least one of a waypoint, a route including a waypoint, or a trail including a waypoint, wherein the at least one waypoint, route, or trail includes a user-defined waypoint that was generated using a location determined by the marine electronic device while the watercraft was on a body of water;

store, in a memory of the marine electronic device, a plurality of points of interest that includes at least the generated point of interest;

receive, at the marine electronic device, user input defining a geographical region, wherein the defined geographical region is a smaller portion of a larger geographical region such that some of the plurality of points of interest lie outside of the defined geographical region;

determine, from the memory of the marine electronic device, a subset of the plurality of points of interest that lie within the defined geographical region;

form, from the memory of the marine electronic device, a file that includes the subset of the plurality of points of interest that lie within the defined geographical region and not the some of the plurality of points of interest that lie outside of the defined geographical region; and transmit from the marine electronic device the formed file to a remote server for storage and later use.

2. The non-transitory computer-readable medium of claim 1, wherein the plurality of computer-executable instructions that cause the computer to transmit the file to an external device comprise a plurality of computer-executable instructions that cause the computer to export the file using at least one of a serial port interface, a network interface, or a combination thereof using the interface.

3. The non-transitory computer-readable medium of claim 1, wherein the plurality of computer-executable instructions further cause the computer to:

detect a file format used by the external device; and format the file according to the detected file format used by the external device.

4. The non-transitory computer-readable medium of claim 1, wherein the at least one waypoint is associated with a depth gathered from a sonar system of the watercraft.

5. The non-transitory computer-readable medium of claim 1, wherein the plurality of computer-executable instructions that cause the computer to receive the user input defining the geographical region further cause the computer to receive the user input in the form of a polygon shape directed to a chart displayed on a touch screen.

6. The non-transitory computer-readable medium of claim 1, wherein the plurality of computer-executable instructions that cause the computer to receive the user input defining the geographical region further comprise a plurality of computer-readable instructions that cause the computer to receive a plurality of latitude and longitude coordinate pairs of the geographical region.

7. The non-transitory computer-readable medium of claim 5, wherein the plurality of computer-executable instructions that cause the computer to receive the plurality of latitude and longitude coordinate pairs further comprise a plurality of computer-readable instructions that cause the computer to:

display a map on a touch screen; and receive a contact at a particular location on the touch screen, wherein the particular location on the touch screen is indicative of at least one pair of the plurality of latitude and longitude coordinate pairs.

8. The non-transitory computer-readable medium of claim 1, wherein the plurality of computer-executable instructions further cause the computer to display the defined geographical region and the subset of the plurality of points of interest that lie within the geographical region.

9. A marine electronic device for a watercraft, the marine electronic device comprising:
   one or more processors;
   a screen connected to the one or more processors;
   a memory storing a plurality of executable instructions which, when executed by the one or more processors, causes the one or more processors to:
      generate, at the marine electronic device on the watercraft and based on user input directed to the marine electronic device, a point of interest, wherein the point of interest comprises at least one of a waypoint, a route including a waypoint, or a trail including a waypoint, wherein the at least one waypoint, route, or trail includes a user-defined waypoint that was generated using a location determined by the marine electronic device while the watercraft was on a body of water;
      store, in the memory of the marine electronic device, a plurality of points of interest that includes at least the generated point of interest;
      receive, at the marine electronic device, user input defining a geographical region, wherein the defined geographical region is a smaller portion of a larger geographical region such that some of the plurality of points of interest lie outside of the defined geographical region;
      determine, from the memory of the marine electronic device, a subset of the plurality of points of interest that lie within the defined geographical region;
      form, from the memory of the marine electronic device, a file that includes the subset of the plurality of points of interest that lie within the defined geographical region and not the some of the plurality of points of interest that lie outside of the defined geographical region; and
      transmit from the marine electronic device the formed file to a remote server for storage and later use.

10. The apparatus of claim 9, wherein the plurality of executable instructions that cause the one or more processors to transmit the file comprise executable instructions that cause the one or more processors to export the file using at least one of a serial port interface, a network interface, or a combination thereof.

11. The apparatus of claim 9, wherein the plurality of instructions further cause the one or more processors to:
   detect a file format used by the external device; and
   format the file according to the detected file format used by the external device.

12. The apparatus of claim 9, wherein the plurality of executable instructions that causes the one or more processors to receive the user input defining the geographical region further causes the one or more processors to receive user input in the form of a polygon shape directed to a chart displayed on a touch screen of the marine electronic device.

13. A method for providing points of interest data from a marine electronic device to an external device, the method comprising:
   generating, at the marine electronic device on a watercraft and based on user input directed to the marine electronic device, a point of interest, wherein the point of interest comprises at least one of a waypoint, a route including a waypoint, or a trail including a waypoint, wherein the at least one waypoint, route, or trail includes a user-defined waypoint that was generated using a location determined by the marine electronic device while the watercraft was on a body of water;
   storing, in a memory of the marine electronic device, a plurality of points of interest that includes at least the generated point of interest;
   receiving, at the marine electronic device, user input defining a geographical region, wherein the defined geographical region is a smaller portion of a larger geographical region such that some of the plurality of points of interest lie outside of the defined geographical region; and
   determining, by a processor and from the memory of the marine electronic device, a subset of the plurality of points of interest that lie within the defined geographical region;
   forming, from the memory of the marine electronic device, a file that includes the subset of the plurality of points of interest that lie within the defined geographical region and not the some of the plurality of points of interest that lie outside of the defined geographical region; and
   transmitting from the marine electronic device the formed file to a remote server for storage and later use.

14. The method of claim 13, further comprising displaying the defined geographical region and the subset of the plurality of points of interest that lie within the defined geographical region on a screen of the marine electronic device.

15. The method of claim 13, wherein transmitting the file further comprises exporting the file through an interface.

16. The method of claim 13, wherein receiving the user input defining the geographical region further comprises receiving user input in the form of a polygon shape directed to a chart displayed on a touch screen of the marine electronic device.

* * * * *